Feb. 24, 1925.　　　　　　　　　　　　　　　　1,527,890
E. G. F. LOCKYER
FOOD CONTAINER AND CARRIER
Original Filed Aug. 8, 1922　　3 Sheets-Sheet 3
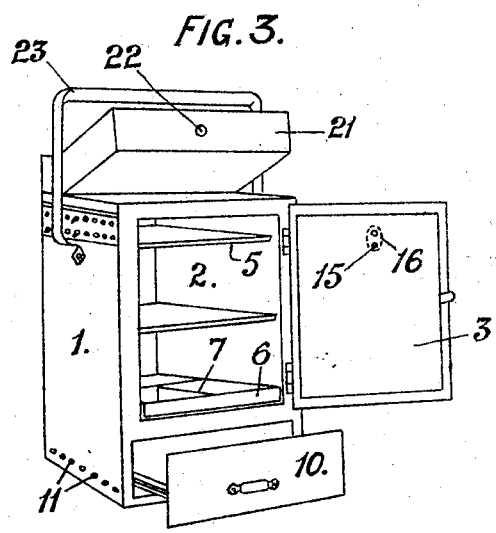
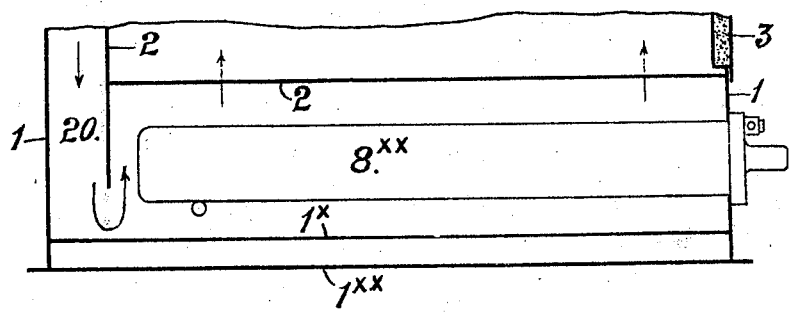
Inventor
E. G. F. Lockyer
by
Atty Patented Feb. 24, 1925.

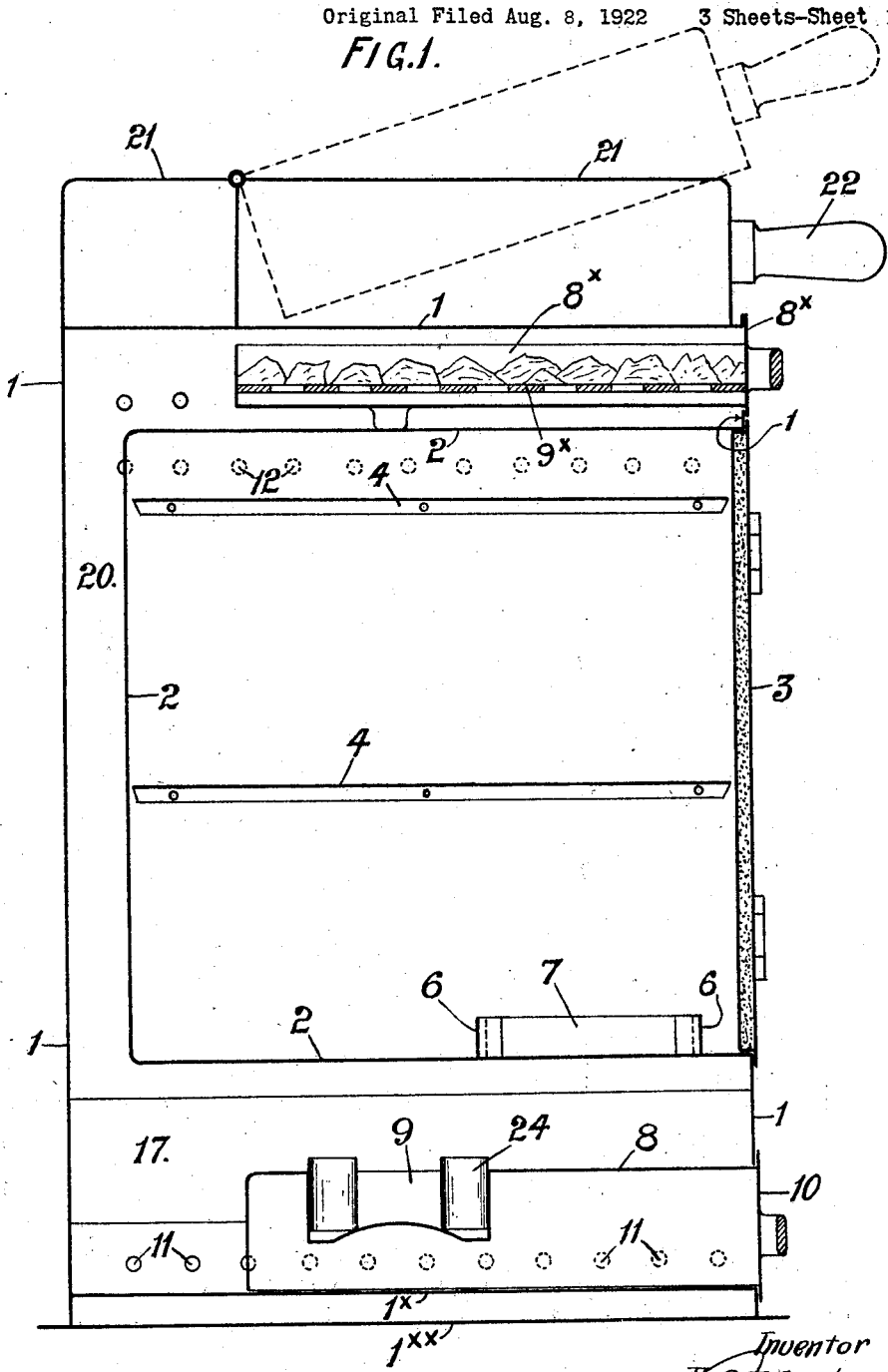

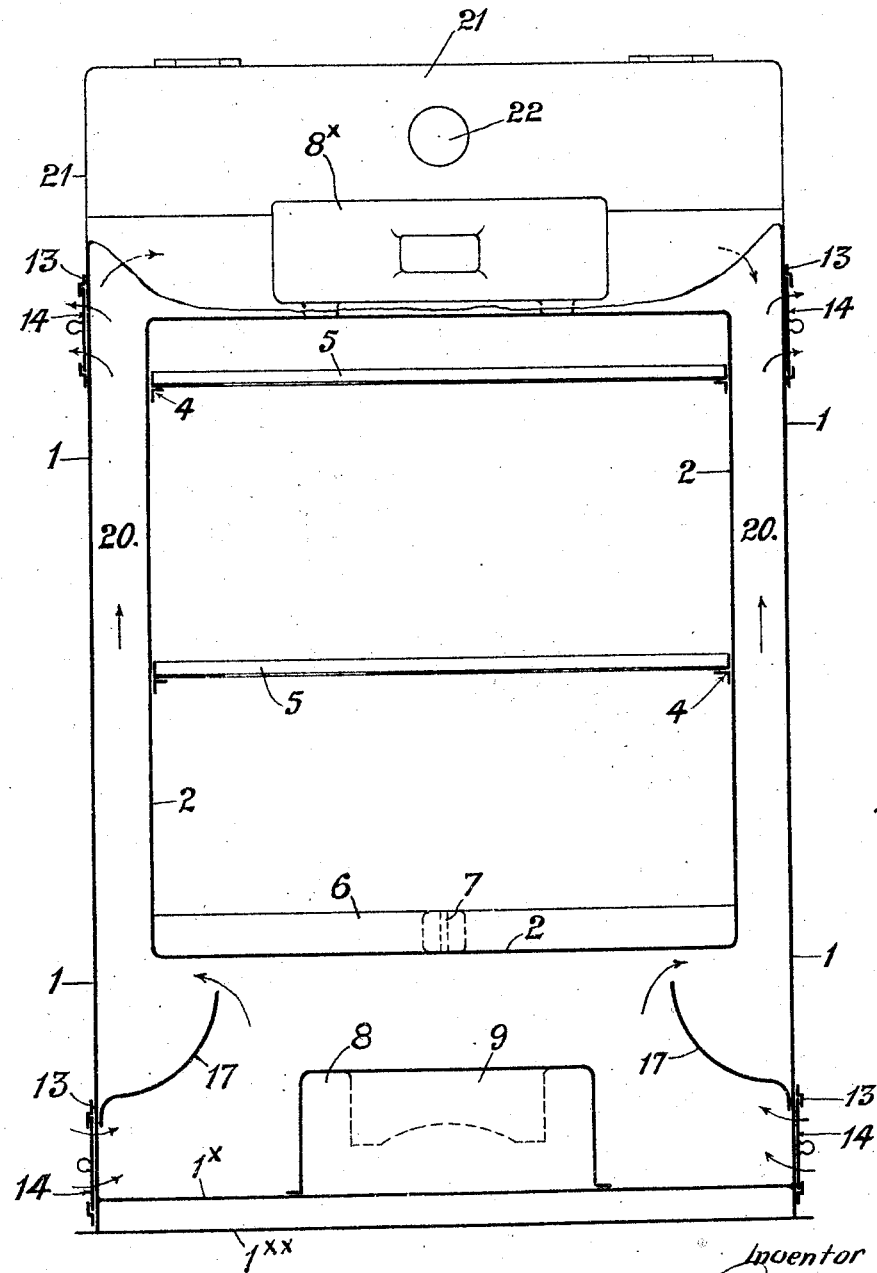

1,527,890

UNITED STATES PATENT OFFICE.

EMILY GODWIN FRY LOCKYER, OF LONDON, ENGLAND.

FOOD CONTAINER AND CARRIER.

Application filed August 8, 1922, Serial No. 580,514. Renewed December 9, 1924.

*To all whom it may concern:*

Be it known that I, EMILY GODWIN FRY LOCKYER, a subject of the King of England, and residing at London, W. C. 1, England, have invented certain new and useful Improvements in and Connected with Food Containers and Carriers, of which the following is a specification.

This invention has reference to apparatus for carrying or holding food either in the cooked or other condition, and preserving it at the temperature desired, more especially for maintaining food at comparatively high temperatures, or alternatively at low temperatures.

In the food carrier or container according to this invention, the tray on which solid fuel is held and burned is a tray which is readily withdrawable, and the products of combustion pass up through spaces between inner and outer chambers; and air inlet apertures, and gas outlet apertures, controlled by slides or regulators are provided on the bottom and top of the sides of the outer case. When the apparatus is used for keeping food cool, these apertures would be closed, and ice instead of fuel would be placed in a drawer.

In some cases the heating medium may be electricity.

In the case where the apparatus is used for keeping food hot, it is particularly serviceable for carrying foods or cooked meats from the place where it is cooked, and delivering it at houses or places where it is to be consumed and maintaining it at that temperature; but it can be used generally as a readily portable container or carrier for food or meals.

Instead of having two separate grates or trays, one for fuel and one for ice, the device may be adapted to hold either solid fuel or ice.

The invention is illustrated in the annexed drawings, in which Figure 1 is a vertical sectional view, Figure 2 a vertical cross section, and Figure 3 a perspective view of a rectangular carrier of sheet metal according to this invention. Fig. 4 is a broken vertical sectional view of the lower portion of the container showing the application of an electric heater thereto.

Referring to the drawings, 1 represents the outer chamber, and 2 the inner chamber. 3 is the door; 4 are ledges secured to the sides of the inner chamber 2 for supporting slidable trays 5, which will be provided with suitable holes or formations for receiving or holding food receptacles or holders, such as basins, dishes and the like; whilst on the bottom of the chamber there are transverse upwardly projecting bars 6—preferably removable—with a division 7, which forms sockets for basins, dishes or the like, and the bottom space beyond the inner bar 6 also serves as a surface for holding food containers.

The door 3 is of the full width and depth of the inner chamber 2, so that easy access is had to it for the introduction of trays, and withdrawal of same, and other articles.

The grate or holder for the combustible material is in the case shown, in the form of a tray 8, provided in its roof with a well 9, in which the fuel is carried.

The front bottom portion of the outer case has an opening in it into which the grate tray 8 can be slid; and when it is introduced, the front plate 10 of the tray fits against the front of the carrier, and closes this opening.

The tray 8 has flanges at its lower edge, which slide in grooved ledges $8^x$ on the bottom plate $1^x$ of the container. Beneath the plate $1^x$ is another plate $1^{xx}$ forming a double bottom to the apparatus, which may be empty or filled with a non-conductor of heat.

Holes 11 are provided in the sides of the outer chamber 1 near the bottom for the admission of air; and holes 12 are provided at the sides of this chamber at the upper part, for the discharge of air and gases.

Ledges 13 are provided on the outside of the chamber for receiving and holding sliding dampers 14, so that when they are inserted, the holes at the bottom and top are closed, which will be done when the apparatus is to be used for retaining food at a relatively low temperature.

When the food is to be kept cold, ice is placed in the tray $8^x$ at the top of the container, the tray having a raised gridded or perforated grate bottom $9^x$, on which the ice is carried; the water of the melting ice falling through the openings in the grate into the bottom of the drawer.

The door 3 is made of two plates as shown, and the space between the plates will be filled with a bad conductor of heat; and openings 15 may be provided in the upper part of the door for ventilating the inner chamber, a damper 16 being provided on the outside of the door for closing the holes when desired.

The surfaces of the outer chamber or parts of the container, may be lined with asbestos or other suitable bad conductor of heat, wherever it may be required.

Directing plates 17 are provided beneath the bottom of the chamber 2, above the openings 11, to guide products of combustion on to the bottom of the inner chamber, and thence into the spaces 20.

Above the roof of the chamber 1, there is a hinged cover 21, having a handle 22, by which it can be moved up and down; and the space within this cover serves as a hot chamber for holding food containers, plates and the like.

The apparatus is provided with a carrier handle 23.

The kind of fuel which is advantageous consists of short cylinders of prepared charcoal, which are shown in dotted lines in Figure 1, and marked 24; and if these cylinders be placed in the well 9 of the grate tray 8, as shown, they will burn after ignition, at a suitable rate, necessary for maintaining the temperature required. To ignite the fuel, a small quantity of a suitable spirit may be poured into the bottom of the well 9, which will run into the lower edge parts of same, below the raised centre; and when ignited, it will ignite the fuel cylinders, which will thereafter burn steadily.

When electricity is used as the heating medium, electrical heating units $8^{xx}$ are used, and slide into position through the case 1, at the bottom of the container. The air heated by the units ascends up the side passages 20 of the container to the top, and then descends through the back passages or flues 20, and again over the heating units, and so is reheated and recirculated. In this case no air can enter or leave the passages or flues through which the air circulates.

What is claimed is:—

A portable food container, comprising a casing, a chamber within the casing and having its walls spaced from the walls of the casing, a compartment at the lower end of the casing, the top of which is formed by the bottom of said chamber, and means in said compartment to slidably receive a heater for directing the heated products directly into contact with the walls of said chamber, a plate at the upper end of the casing and open to the heated products from the heater, and a hollow cover mounted for swinging movement above and relative to said plate and adapted to form with said plate a closed container for articles to be kept warm.

In testimony whereof I have signed my name to this specification in the presence of two subscribing witnesses.

EMILY GODWIN FRY LOCKYER.

Witnesses:
  DAVID CORRY,
  CHAS. J. FALCONER.